United States Patent [19]

Ragle et al.

[11] 4,148,080
[45] Apr. 3, 1979

[54] DI-BIT RECORDING TECHNIQUE AND ASSOCIATED SYSTEM

[75] Inventors: Herbert U. Ragle; Norman S. Blessum, both of Thousand Oaks, Calif.

[73] Assignee: Burroughs Corporation, Detroit, Mich.

[21] Appl. No.: 820,868

[22] Filed: Aug. 1, 1977

Related U.S. Application Data

[63] Continuation-in-part of Ser. No. 807,155, Jun. 16, 1977.

[51] Int. Cl.² .......................... G11B 5/09; G11B 27/10
[52] U.S. Cl. ........................................ 360/51; 360/21
[58] Field of Search .......................... 360/21, 76–77, 360/71, 50–51

[56] References Cited

U.S. PATENT DOCUMENTS

| | | | |
|---|---|---|---|
| 2,929,670 | 3/1960 | Garrity | 360/21 X |
| 2,938,962 | 5/1960 | Konins et al. | 360/76 |
| 3,185,972 | 5/1965 | Sippel | 360/76 X |
| 3,665,118 | 5/1972 | Cooper, Jr. | 360/21 |
| 3,678,220 | 7/1972 | Luhrs | 360/71 |
| 3,686,649 | 8/1972 | Behr | 360/77 |
| 3,810,234 | 5/1974 | Monett | 360/51 |
| 3,964,094 | 6/1976 | Hart | 360/76 X |
| 4,007,493 | 2/1977 | Behr et al. | 360/77 |
| 4,037,257 | 7/1977 | Chari | 360/51 |
| 4,074,328 | 2/1978 | Hardwick | 360/76 X |

FOREIGN PATENT DOCUMENTS 174220  8/1952  Austria .......................... 360/21

*Primary Examiner*—John H. Wolff
*Attorney, Agent, or Firm*—John J. McCormack; Nathan Cass; Kevin R. Peterson

[57] ABSTRACT

Techniques and associated apparatus for recording and detecting data; and especially for detecting and processing recorded data with greater accuracy.

Record information (computer data bits) is recorded along one or more information zones (tracks) of a medium. Head-positioning information may be derived from this, using a "di-gap" transducer system comprising at least one related pair of transducer gaps aligned to register and sense information along a common record track, with the gaps being skewed oblique to the track direction, and aligned transverse to one another.

"Servo-bits" (providing head positioning information) and "work-bits" may both be recorded along a given track, these bits, like the mentioned gaps, being skewed relative to the track direction and aligned transverse to one another; the servo-bits in any one track thus being aligned parallel to one of the gaps while the companion work-bits are parallel to the other gap, — these gaps however being functionally interchangeable, with neither gap being dedicated to servo data or work data.

Di-bits may be recorded (or pairs of parallel bits) in adjacent tracks but distinguished by recorded-frequency. Also, data read-out may be "clocked" using means adaptive to varying data rate.

6 Claims, 18 Drawing Figures

DI-BIT RECORDING TECHNIQUE AND ASSOCIATED SYSTEM

CROSS REFERENCE TO RELATED APPLICATION

This is a Continuation-in-part of copending commonly assigned U.S. Application, Ser. No. 807,155, filed June 16, 1977, entitled "Improved "Track-On-Data" Technique and Associated System", by Herbert U. Ragle and Norman S. Blessum.

BACKGROUND OF THE INVENTION

The subject invention relates to magnetic recording systems and particularly to improved techniques for recording and reading-out data therefrom.

Those in the magnetic recording arts recognize the need for improved techniques and associated apparatus for better, more accurate data detection. Efforts have continued for sometime now to fill this need.

One such recording system involves a magnetic disk typically used as peripheral memory equipment in a computer system to provide (temporary or permanent) information storage during computer operations. In one well-known configuration, one or several such disks are mounted to be rapidly rotated in operative relation with transducer means, each disk having a multi-track magnetic recording surface on at least one of its faces. One, or several, recording heads are, in turn, adapted to be positioned along each disk-face — i.e., to register with any selected one of the concentric recording tracks on the disk to record and detect data signals along any track.

Workers will recognize that optimal use of such media requires that information be recorded at the highest possible density, yet accurately read-back. Present-day techniques record at densities of up to thousands — in certain cases tens of thousands — of bits per inch. Similarly, workers strive to maximize the number of circumferential tracks on a disk, with each track as narrow as possible. Accordingly, with even-higher bit densities and track densities, it is apparent that head-positioning systems are being pushed to their limit. Systems for quickly and accurately registering heads with a selected data track are becoming more and more sophisticated, and more complex and expensive, and their operating parameters more stringent. The invention responds to this need, teaching a novel technique whereby "track-on-data" and more accurate read-out is feasible.

Workers will recognize that for the typical magnetic disk system a recording head is translated radially across the disk so that the magnetic transducer gaps mounted therein may be selectively positioned adjacent a selected recording track. In this way only a few transducer gaps need be used for recording and reading data on a number of disk tracks — but to practically implement such a system, a very careful, accurate control of head location relative to the tracks must be kept — and this typically must be done very quickly to minimize access time for the computer system served.

For instance, with disks used in a random access magnetic memory the data bits are recorded in concentric circular tracks so there is a continual need to secure and maintain very accurate registry of a magnetic transducer with a selected track. Unfortunately, the precision of the transducer-positioning system will determine track spacing tolerances and accordingly will influence data storage efficiency (bit compression) significantly — that is the number of characters per unit memory area will depend upon the accuracy of transducer positioning. Workers have attempted in various ways to improve the accuracy of transducer positioning, for "servoing" the transducer onto disk tracks. Such systems have commonly employed "position signal" tracks (or track sectors) interspersed with the data tracks and have also required a special servo transducer detector to detect the "position-signals". They also add the operation of writing the servo data. Such features inherently degrade data storage efficiency — because of the separate servo transducer system required (e.g., buildup of mechanical tolerances in the different transducers used; because of the considerable loss of useful data recording area to recording position-bits, and so forth).

Workers in these arts will recognize that it is quite desireable to "track-on-data", that is to somehow use the area devoted to "data-bits" (i.e., "information signals" developed from certan magnetic transitions) to also provide position control signals which may be fed to a positioning servo and control the positioning and/or alignment of a transducer relative to a recorded track. Obviously, such a technique can eliminate the need for a separate "servo" recording unit and related separate recording zones for servo data (such as separate servo disks or separate servo tracks, or track-sectors, typically seen in conventional magnetic recording systems) since the data-transducer and the data-recording zones may be used for servo-bits too. The invention accomplishes this, providing a "track-on-data" system with no need for separate servo tracks and providing more accurate means of data read-back.

Workers will recognize the significant advantages from such a "track-on-data" technique. For instance, present-day magnetic disk memory systems typically allocate servo-bits to special "servo tracks" (either on a special portion of each disk or on a special disk in each file) dedicated to this purpose. Workers will also acknowledge that present-day systems commonly detect transducer positioning (servo) signals according to amplitude-modulation techniques (i.e., by variations in the amplitude of position-indicating recorded magnetic transitions, or "servo-bits"), and that this is less than optimal. For instance, the amplitude-sensitive transducers typically required are all too subject to "noise". Since erroneous amplitude variations can result from many common sources, such "noise" makes the servo systems based on this approach subject to serious error. An example of this approach is found in U.S. Pat. No. 3,864,740 to Sordello et al. and in U.S. Pat. No. 3,185,972 to Sippel and in U.S. Pat. No. 3,614,756 to McIntoch, et al.

The Sordello patent in particular will indicate the lengths to which workers have gone to try to compensate for the difficulties arising from amplitude sensing. That is, Sordello will be seen to represent a "track following" method of detecting transducer position wherein prerecorded tracks are positioned on a recording medium so as to facilitate the direct detection of transducer position relative to the medium. A related U.S. Pat. No. 3,404,392 to Sordello discloses a track-following servo system. In this system a special pair of servo tracks is laid down on either side of each data track, the servo-bits in one of these servo tracks being recorded at one signal frequency and those of the other at a second frequency, the corresponding servo-output signals being frequency-separated by electronic filtering means which generated a summed servo signal. With such a system it is imperative that the frequencies of the two servo tracks differ sufficient to permit effective filtering and signal separation since the associated detecting transducer was "reading" both tracks simultaneously.

Conversely the first-named Sordello patent (U.S. Pat. No. 3,864,740) postulates a pair of adjacent servo tracks wherein equal-amplitude servo signals are impressed, the servo tracks being prerecorded on the medium with a relatively inconsequential frequency difference; then, upon detection, the resultant servo signals are frequency-multiplied. That is, a pair of servo signal detection means are provided to modulate (multiply) the transducer output with modulating signals at the frequency of the first and second servo track waveforms and thereby generate a summed servo-output. This output represented the frequency difference between the original servo signal and respective modulating signal. By detecting the magnitude of this output (difference) signal, servo signals are generated for regulating servo positioning means.

Such a system will servo the transducer into registry with a selected data track. Workers will realize that the servo tracks flanking each data track represent a single continuous linear recording at two different encoded frequencies. Thus, if a single transducer is arranged to simultaneously read a data track and the flanking servo tracks — all together — and if means are provided to filter the servo information from the data signals, and then compare the two servo signals: then, one may develop a "position-error" signal and apply it to an actuator-servo unit to reposition the transducer.

However, such a system has the inherent disadvantage that the data and servo-bits must be separately recorded and at widely-spaced frequencies. Also, the servo frequencies cannot be harmonic of one another lest there be any harmful interaction between the (data and the servo) outputs. Another serious disadvantage, is that such a magnetic transducer will have a different transfer function for the data bits (frequency) then it has for the servo-bits (frequencies); and this can introduce further error.

Similarly, in the cited McIntosh patent a transducer positioning system is taught which comprises a magnetic disk with servo tracks and data tracks, with the magnetic domains of the servo tracks oriented relatively orthogonal to those of the data tracks. A transducer is provided to generate two outputs — a "data output" representing the rate of intensity change of the magnetic data domain and a "servo output" representing a function of the absolute magnitude of magnetic field represented by the magnetic servo domains. A flux-sensing portion of the transducer detected this servo output and thus indicated the transducer position relative to the data track, presenting an "error signal" to a servo positioning means.

One feature of such a servo system is that it provides a head repositioning-(or servo-error-) signal which is independent of medium movement relative to the transducer — that is, the acceleration or deceleration of the medium will not effect transducer responser — evidently because the flux-sensing means will provide the prescribed output independent of whether the medium is moving at different speeds or is motionless. Also such a servo system provides for orthogonal isolation between (the magnetic influence of adjacent) servo-bits and data bits so recorded. This invention provides the same advantages while eliminating the need for a separate servo track. Other approaches are known which involve separate servo tracks (e.g., U.S. Pat. No. 4,007,493 to Behr, et al.; U.S. Pat. No. 3,964,094 to Hart); where, by contrast, systems according to the invention do not.

Workers are aware of present-day magnetic recording systems that use prerecorded servo tracks (e.g., see U.S. Pat. Nos. 3,903,545 to Beecroft, et al.; 2,938,962 to Konins, et al.; 3,404,392, to Sordello; and 3,185,972 to Sippel). One implementation involves a stacked multi-gap transducer adapted to register an intermediate head-gap over a "selected" data track while using a pair of flanking gaps to read servo-bits from a pair of servo tracks flanking each data track.

INVENTION FEATURES

The present invention teaches the use of a di-gap transducer array, with a gap pair oriented to be orthogonal to one another as well as disposed "in-line", along the track-direction, and recording bits at different encoded frequencies. These gaps are adapted to conjunctively read two different kinds of (data/servo) bit sets arranged along the track, one kind aligned with one such gap, the other kind at right angles and thus aligned with the other gap. The servo-bit locations may indicate head-misregistration and, as detected, do so in terms of elapsed time between prescribed servo signals along any given track.

According to one feature, systems according to the invention so function without inter-track "guard-bands" or the like; disposing adjacent data tracks in abutment with one another. Also, the magnetic data transitions are skewed in parallel along one track while being skewed — orthogonal to this track — along both adjacent tracks in a "herringbone" pattern. As explained, this can minimize adjacent channel interference and also dispense with the need for such things as "guard-bands".

According to one embodiment, servo positioning signals are interspersed among data-bits and detected with a single "di-gap" transducer head. ["Di-gap head" hereinafter referring to a pair of positionally-related magnetic transducer heads, each head comprising a pair of pole pieces separated by a transducing gap and wound with an associated coil-activation circuit — through the windings and one pole-piece may, of course, be shared]. Workers will recognize the advantages of this approach; for instance, eliminating the need for separate servo heads and recording operations — as opposed to the prerecorded ("initialized") disks in common use today.

Of course, others have contemplated the use of "orthogonal data tracks" (e.g., see the cited Sippel patent). Likewise, others have thought about monitoring head registration according to the path a transducer gap relative to an array of magnetic domains arranged diagonally across a recording track (e.g., see the pattern of servo tracks and related detection technique taught in U.S. Pat. No. 3,686,649 to Behr).

However, the instant data detection arrangements will be distinguished as novel and unexpectedly effective, combining the "adjacent orthogonal", abutting track arrangement — with data bits arranged in oblique "herringbone" pattern and "servo-bits" interspersed and orthogonal — with a related di-gap servo/data transducer array, and with "dual-frequency" recording and detection; and/or with self-modulated read-out clocking.

Preferably, such an arrangement is used with disks having "adjacent abutting" data tracks with data bits aligned oblique and parallel along a track and orthogonally between tracks, with a respective pair of transducer gaps disposed "in line" to be translated along a selected track to develop data and servo signals both therefrom.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 1A showing an enlarged area of the disk as disposed relative to a di-gap transducer provided for use with the invention;

FIG. 2 indicates a single record track, encoded by position and disposed relative to associated transducer indicia according to a related feature; while FIGS. 2A, 2B and 2C indicate suggestive transducer dual-outputs for three illustrative transducer positions;

FIG. 9 is a plan view like FIG. 1A of a particular method of di-bit recording according to a dual-frequency technique according to one feature of invention, while FIG. 8 shows a detection system like that of FIG. 5, however modified to implement detection of such dual-frequency recording.

DESCRIPTION OF THE PREFERRED EMBODIMENT

GENERAL DESCRIPTION, BACKGROUND

Figure 1:
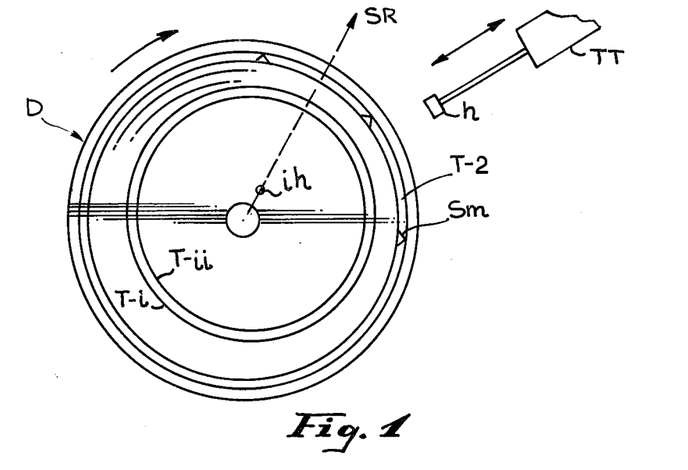
FIG. 1 is a very schematic plan view of a magnetic disk record with a simple record track indicated as position encoded according to one feature.

FIG. 1 schematically illustrates a magnetic recording disk D constructed according to principles of this invention. This, and other magnetic recording means discussed herein, will generally be understood as constructed and operating as presently known in the art, except where otherwise specified. Such a recording disk is relatively conventional, being about one foot in diameter and formed of a non-magnetic substrate material with a thin magnetic recording medium applied to one face (alternatively, to both faces).

Such disks are commonly mounted on a turntable which is seated on a precision-bearing spindle and rotated at high speed during operation. Thus, every bit along any selected circumferential track (see illustrative recording tracks T-1, T-2 and T-3 in FIG. 1 and 1A) is swept past magnetic transducer means (here, see transducer head "h" on arm TT) many times a second for minimum access time and high speed read-out. In a commerical disk unit, one or several such disks is employed, each having one or several transducers per disk. Conventionally, record information ("work-bits") is recorded along the data tracks. One or several servo-transducer means is often provided and arranged to be operated in conjunction with special servo-tracks (or track-sectors) on which servo-data (servo bits) is recorded.

The rotational rate (rpm) of disk D is normally carefully controlled so that any small relative change in rotational speed is quickly corrected and so the magnetic reading and writing operations are kept constant. Conventionally, the rotational position of the disk is indicated by angular encoding means, clock tracks, index indicia (e.g., hole 1h along "start radius, SR", FIG. 1), or the like. Such features are conventional and not detailed here since they are not of special significance is practicing the invention.

This servo information is used to align a transducer head (here, see head "h" mounted on transducer-translator unit TT and conventionally positioned thereby) radially of disk D, i.e., with its transducer gaps registered with a given selected track on disk D, using means well known in the art (and not shown or described here). A reference radius is conventionally indicated by passage of an index indicium over a related detector (e.g., here, see index hole "ih" along "start radius" SR). Complicating this servo function are the typical deviations of disk tracks from perfect concentricity (with one another and/or with their disk). This is indicated by tracks T-i, T-ii which will be understood as out of concentricity, both with disk D and with reference track T-2.

Figures 1A, 2, 2A, 2B, 2C:
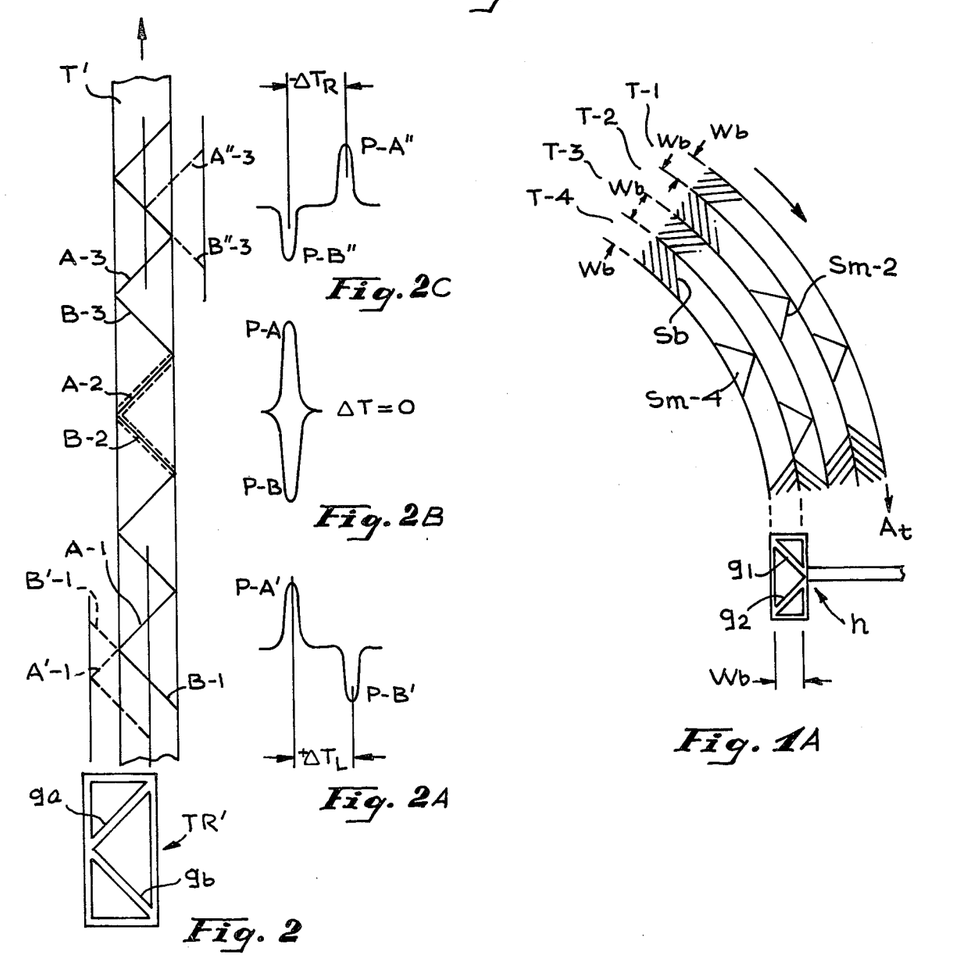

Representative tracks of disk D are fragmentarily shown—exploded and with recording bits also illustrated—in FIG. 1A along with an enlarged, very schematic showing of head "h", understood as adapted for recording and detection of such bits.

As is conventional, it will be understood that work bits in the form of magnetic signals "wb" are recorded on the face of disk D by a transducer-gap provided in the transducer array (here, represented by either of the gaps "g" of "di-gap head" "h") which is appropriately positioned. Head "h" will be understood as coupled mechanically to a positioning unit (not shown) including position-actuator means arranged and controlled so that transducer "h" is translated radially across D to be operationally superposed over a selected track (very schematically indicated by head translation arm TT and generally understood in the art, hence no details are indicated or necessary).

Thus, for example, the position control can comprise a so-called "voice coil actuator", i.e., a magnetic positioning device very similar to that employed in loud speakers. Such actuators are generally preferred because they are inexpensive, fast, accurate and readily controlled with conventional circuitry. However, if desired, other mechanical, electromechanical or hydraulic positioning control means may be employed, as is well known in the art.

Work-bits "wb" will be understood as recorded along the disk tracks by appropriate energization of the related magnetic transducer gap in head "h", and to comprise a sequence of magnetic transition signals of identical encoded magnetic polarity and alignment. Here, preferably, and according to a feature aptly employed with the invention, work-bits "wb" are impressed at a common prescribed angle to be all similarly oblique with respect to the respective track axis $A_t$. (The direction of translation of the track with respect to the transducers).

According to one feature, a bit encoding scheme establishes, for each track, a prescribed alignment for work-bits and for servo-bits, this alignment being arranged to automatically indicate registration, or centering, of transducers with respect to a track). For instance, for tracks T-1, T-2, T-3, etc., in FIGS. 1, 1A, it will be understood that the work bits "wb" are aligned in one oblique direction along all "odd-number" tracks (e.g., T-1, T-3) and aligned transversely in all "even-number" tracks (e.g., T-2). The servo-bits "sm" are aligned orthogonal to the work-bits along any given track.

These recording tracks will be understood as schematically represented here by a mere sector of the full disk/track circumference; there being a great number of such tracks understood as concentrically arranged, in abutment, on disk D. Each of the concentric recording tracks in distinct in location, length and curvature and the transducer and associated gaps must be very precisely registered thereon before writing or reading may be properly performed—as workers in the art very well know.

Thus, in order to position a transducer gap in operative (read/write) relation above a selected track, the position of the transducer head must be detected and checked for "centering" along this track. Conventionally, a raw position signal would be compared with a reference signal which represents the "centered" (or registered) head position. Any discrepancy between these indicates the degree of misregistration and is processed to result in an "error signal" fed back to a position controller (in a conventional servo loop) for precise repositioning and control of the head.

In some known systems, track location is indicated by "servo-bit" magnetic transitions provided along special dedicated servo tracks, of a disk. In one well known system, such servo-bits are recorded along special servo tracks disposed between adjacent data tracks, as suggested, for instance, in the cited U.S. Pat. No. 3,686,649 to Behr. By contrast, in the subject embodiments, the data tracks are abutted (radially) with the bits aligned to be orthogonal between adjacent tracks—doing away with intervening spaces for servo tracks, guard-bands, etc.

Such a "radially-abutting" track configuration will be recognized as facilitating maximum track density. However, this makes it necessary to record servo information bits along a portion of the data tracks. It also makes it critical that the read/write gaps be positioned very accurately, since a transducer gap might otherwise easily drift over an adjacent recording track. These requirements are met in systems according to the invention, with a "di-gap/di-bit" servo control described hereinafter. That is, a transducer is provided with a pair of skewed orthogonal gaps, [such as gaps $g_1$, $g_2$ of head "h" in FIG. 1 and 1A]; and related servo bits are recorded to comprise at least one pair of similarly-skewed, mutually-orthogonal servo-bits [such as servo-bits "sm" in FIGS. 1 and 1A].

FIG. 1 EMBODIMENT

Turning to the details of FIGS. 1 and 1A, the indicated magnetic transducing arrangement will be understood as adapted to operate upon the abutting concentric data tracks T-1, T-2, T-3, etc., of a magnetic recording disk D, when the disk is rotated in the known manner. Servo-bits "sm" in the form of skewed, mutually-orthogonal di-bits will be understood as distributed in a prescribed manner along each given track T, being inserted among the work-bits "wb", along with (track/-sector) indentifying bits "sb". Work-bits "wb" are aligned in parallel, and similarly skewed, along every track, being "orthogonal" between adjacent tracks (i.e., they are "skewed and adjacent-orthogonal"). This magnetic information will be understood as conventionally recorded and sensed. Such is indicated suggestively by "di-gap" read/write head "h" adapted to be moved radially across disk D to any selected track-location where the transducer gaps will lie superposed above a "selected" track T and centered therealong in close "read/write relation" therewith (see FIG. 1A).

According to one recited feature, head "h" includes at least one "di-gap" array; i.e., a pair of skewed orthogonal gaps $g_1$, $g_2$. Head "h" has a width $w_h$ approximately equal to the (uniform) radial width of $w_t$ of the tracks. Thus, when head "h" is moved into prescribed registration (exactly-centered relation) with a given track T, one of its gaps "g" will align and superpose coincidently with one set of bits (—either "wb" or "sb"; or one half of di-bits "sm", these bits extending across the track in a "first" skew-alignment—) while the companion gap will be similarly aligned with a second set of bits orthogonal to the first. Thus, gap $g_1$ in FIG. 1A, passing along track T-4, (or any "even-no.-track") aligns with "track-sector identifying" bits "sb", and with one of the servo di-bits "sm", while the other gap $g_2$ will align with work-bits "wb", and with the other half of di-bit "sm". Conversely shifting head "h" to be centered along track T-1 (or any "odd-no.-track") will reverse this registration-relation, e.g., $g_1$, aligning with the work-bits "wb", there.

The "magnetic congruency" of such a di-gap transducer and such servo di-bits, (or "chevrons") when a head is centered over a recording track will be seen as facilitating advantageous servo control—with the degree of off-centering, or misregistration, being sensed according to how closely such a di-bit "fits" the passing di-gap—as further described and explained below. This concept will also be better understood upon consideration of the alternate embodiment of FIG. 2 described as follows.

FIG. 2 EMBODIMENT

Here, a "di-bit" data track T' is shown in operative relation with an associated "di-gap" transducer assembly TR' understood as passing over representative track T' in the direction of the arrow, in magnetically operative relation with bits A, B, therealong, but in slight misregistration, with respect thereto (misregistered "to the left"). Transducer TR' thus includes a pair of skewed, mutually—orthogonal transducer gaps $g_a$, $g_b$ aligned oblique (here, preferably 45°) to the axis of track T'. Track segment T' may be understood as a servo-sector like these indicated in FIGS. 1, 1A with similar "di-bits", comprised of relatively orthogonal first and second di-bit-halves, (i.e., magnetic recording half-bits A and B respectively, analogous to servo di-bits "sm" above). Di-bits A, B will be understood as each aligned with a respective transducer gap ($g_a$, $g_b$) and thus orthogonal to one another and oblique (also 45°, preferably) to the track direction (arrow). Track sector T' shows only servo bits and no work-bits, and is here represented as "linear" rather than "curvilinear" (as the actual face of a magnetic recording disk would be)—but only to simplify the explanation. Those skilled in the art will obviously extend the principles explained to curved disk tracks, and other relevant media, including work-bits too, as a matter of course.

Now, it should be understood that the relative disposition of the bi-bit pair A, B and gaps $g_a$, $g_b$ (their spacing and relative angular orientation) is such as to render "magnetic congruency" between a bit and a respective gap when head TR' is centered exactly (registered) along track T'. Thus gap $g_a$ will coincide with bit A and gap $g_b$ will coincide with bit B at a certain time during track passage—and the detecting transducers will thereupon generate a corresponding pair of coincident opposed "servo-output" pulses. A relatively perfect congruence of di-gaps and di-bits is signalled in FIG. 2B by the simultaneity of symmetrically-opposed pulses P-A, P-B representing detection of bits A-1, B-1, etc., by head TR'; pulse amplitude may be equal, but this is not always necessary, though it facilitates a "null-balance" indication of perfect registration, of course, as workers will recognize). This opposite polarity output is readily rendered by known methods.

On the other hand, a slight misregistration of head TR' to the left, as depicated in FIG. 2, should produce the kind of (successive, spaced) non-coincident output pulses indicated in FIG. 2A wherein pulse P-A' (produced by passage of gap $g_a$ over bit A-1) will obviously occur somewhat earlier in time than the companion output pulse P-B'—P-B' reflecting the later passage of gap $g_b$ over companion bit B-1. And, the time-discrepancy $+\Delta T_L$ between output pulses will be a measure of the degree of head misregistration (the positive sign indicating misregistry to the left), as workers in the art will appreciate.

Conversely, rightward misregistration of transducer TR' is signalled in FIG. 2C (such head misregistry not shown here, but indicated schematically by "phantom bits" A''-3, B''-3 in FIG. 2) by the non-coincident servo (timing) pulses P-A'', P-B''. Here, output pulse P-B'' from gap $g_b$ "leads" output pulse P-A'' from companion gap $g_a$ by a time delay $(-\Delta T_R)$ which corresponds to the degree of rightward misregistration (and accordingly is designated as negative delay time).

Workers will visualize other like arrangements for correcting head misregistration wherein transducer di-gaps align oblique to the transport direction can likewise interact with associated (similarly oblique) di-bits so that exact head/track registration is indicated by coincidence of the paired output pulses, while misregistration is indicated by positive or negative non-coincidence. In certain cases such servo-bits may, themselves, constitute work-bits ("record data"), especially where the work-bits are skewed 90° between adjacent tracks (as in FIGS. 1 and 2).

Figures 4, 6, 7:
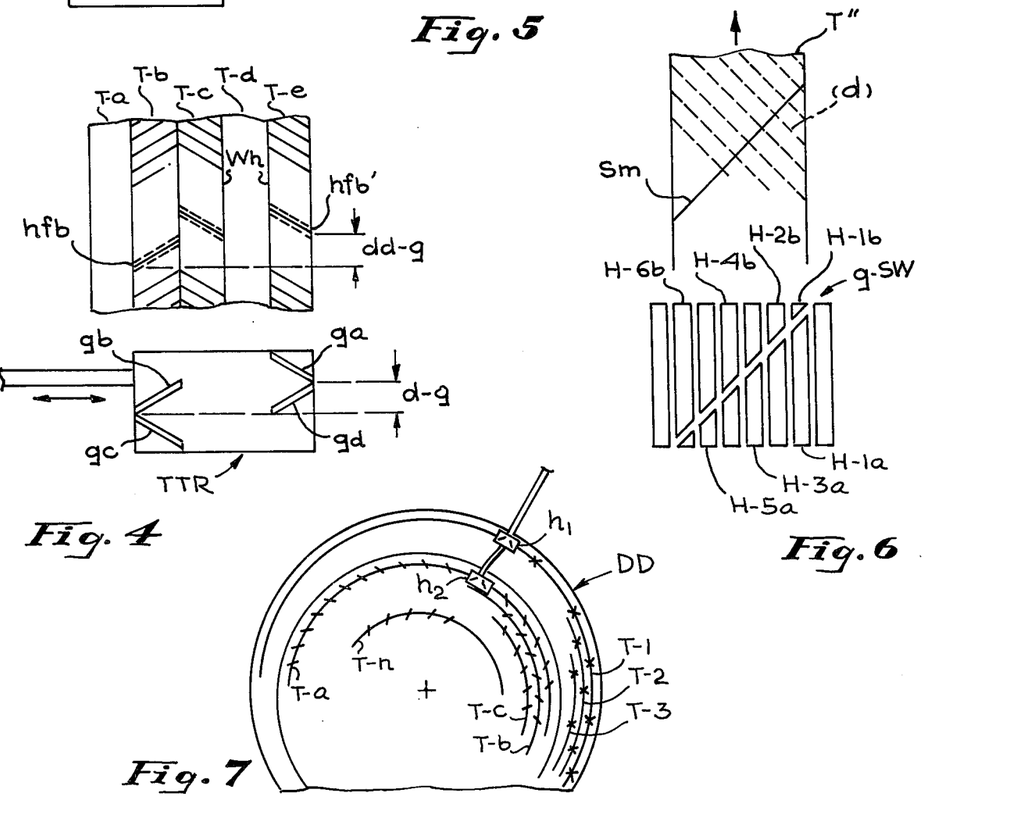
FIG. 4 illustrates, in plan view and greatly enlarged, a schematized fragmentary showing of a set of tracks like those in FIG. 3 as related to "double di-gap" transducer means and data bits indicated according to another feature.
FIG. 6 is similar to FIG. 2, indicating a modified form of position-encoded indicia and associated transducer gaps along a track.
FIG. 7 is a plan view of a disk record as in FIG. 1, schematically indicating a related mode of recording position bits.

This is indicated very schematically in FIG. 4 where segments of abutting adjacent disk tracks T-a, T-b, T-c, T-d, T-e is depicted as comprising skewed work-bits "wb" which are "orthogonal adjacent". According to this feature, periodically a high-frequency burst of "special-bits", hfb, hfb'—similarly skewed—are laid down for head-centering purposes. Workers will appreciate that bits hfb, hfb' may substitute for di-bits like "sm" above. It will be evident, that, according to another mode of "di-gap/di-bit" operation a transducer such as TTR with at least one related di-gap pair (see orthogonal gaps $g_a$, $g_b$) may be provided, with the gaps spaced "across tracks" (rather than "along a track" as above) by a prescribed (odd) number of track widths (here, three—this distance accommodating reasonable gap spacing and head manufacturing tolerances). Di-gap $g_a$, $g_b$ will sense the high-frequency bit pair hfb, hfb' coincidently as an indication that head TR is perfectly centered over tracks (T-b, T-e); non-coincidence indicating misregistry, as before.

It will be evident that the di-bit pair can be variously offset in space (e.g., by offset spacing dd-g, the same as offset d-g between gaps $g_a$, $g_b$) or offset in time (electronically)—gap-to-bit coincidence being provided for either spatially or electronically. Of course, such "work-bits" may be otherwise modified and distinguished to thus serve as "servo-bits"—for instance, written as "invalid bits" (e.g., preceded by three or more (3+) "zeros") or as "special bits".

Also, the head TTR may include a second orthogonal gap pair (here, $g_c$, $g_d$) to accommodate the sensing of work-bits in other tracks (e.g., T-a, T-c, T-e for $g_c$; T-b, T-d, etc., for $g_d$). These second gaps are not needed however and will typically be included only where cost-justified.

Similarly, one oblique gap may be translated along such a track to detect certain aligned servo bits and to generate servo-positioning pulses, with these pulse signals "referenced to center" according to their degree of coincidence with a prerecorded set of "clock signals". The servo output may be time-referenced to such clock signals (indicating "center-track registration" of the servo gap) and thus eliminate the need for contemporaneous detection of a second servo-bit with a second orthogonal gap, as described above. In certain cases (e.g., FIG. 1A) part of a track-sector will include only servo-bits, with abutting "blank track segments" flanking the sector radially, to eliminate risk of noise. This is preferred for this "track-on-data" operation and maximizes data compression.

In any event, the foregoing techniques will be appreciated as facilitating a true "track-on-data", or "servo-on-data" operation, locating the servo-bits directly adjacent their associated data bits and avoiding the difficulties and errors of remotely-located servo indicia.

OPERATION

Returning now to FIGS. 1 and 1A, it will be apparent that a simple, convenient mode of operation may be used to develop "centering information" from servo di-bits "sm" by proper positioning and manipulation of the associated set of skewed di-gaps $g_1$, $g_2$ of head "h". Generally speaking, this will involve head "h" being coarsely-positioned over a given "selected" track; then the servo di-bits being sensed for their degree of congruence with di-gaps $g_1$, $g_2$, so that any minor centering-adjustments necessary can then be made — then, with registration thus assured, optimal data transfer (read-out or writing) may proceed.

More particularly, an illustrative, step-by-step servo sequence is now described as follows (see FIG. 1):

ASSUMPTIONS

The control memory will contain a formatting code indicating the "normal" position (i.e., associated delay-time post "start time") of servo-bits "sm" on each disk track when the head is "centered" there. As FIG. 1 indicates, servo-bits "sm" are distributed about each track T [preferably at the "preamble" to each "data sector", being followed there by "identification bits" "sb", then by the record data (work-bits "wb")] using a frequency matched to servo response. That is, for a given medium velocity, the servo system will have a certain nominal response time for carrying out head-centering position adjustments. For instance, it may be able to complete a repositioning sequence within about 1/10 of a disk revolution — accordingly bits "sm" should be disposed every 36°, or less, for optimal servo response.

Bits "sm" may be prerecorded when a disk is "initialized". Also the format for orientation of work-bits "wb" will be predesignated so that, for instance, bits "wb" will be aligned with gap $g_1$ for all the "odd number" tracks (T-1, T-3, etc.), and aligned with gap $g_2$ for all the "even number" tracks (T-2, T-4, etc.).

And preferably, the servo-bit preamble to each sector, such as indicated at di-bit "sm" in FIG. 1A, will be arranged so that the adjacent abutting track segments are "blank", with no bits recorded thereon, thus avoiding interfering pickup if head "h" is misregistered along a sector-preamble. The "servo-preambles" for alternate tracks may be aligned along a common radial-direction as in FIG. 1A, or else be offset rotationally so as not to interfere with this operation.

First step: Head "h" enters the track area and is roughly centered by coarse positioning means (known, not described) over "selected" track T-4. Now a "centering sequence" is invoked before any data transfer (i.e., "read-out" or "write-in") is attempted;

Second step: At an appropriate "start time" (e.g., following the passage of index hole "ih", as is well known in the art), the servo control stage will begin to monitor the output from gaps $g_1$, $g_2$ to "look for" di-bit sensing and related "servo output" for both transducers. That is, the next following prerecorded servo di-bit or "chevron", "sm" will initiate this servo output (as in FIGS. 2A, 2B, 2C) and be used to identify the track, data block, etc., as well as in a "centering check".

Third step: Centering of head "h" takes place responsive to the output sensed from chevron "sm"-4 (functionally, along the lines indicated elsewhere). Thus, if one servo output pulse is significantly (e.g., beyond a given range) out of coincidence with the other servo output pulse, head "h" will be shifted to correct this — then, with the gaps properly centered, the centering-check is repeated, data block identified, etc., and — finally — read-out of work-bits may begin.

Fourth step: With the gaps now properly "registered" with the bits along "selected" track T-4 (FIG. 1A) optimal, accurate data transfer may begin. Accordingly, the gap $g_1$ output might then be gated to read-out the track number and sector number indicated by (aligned) sector bits "sb"; and thereafter to read-out the work-bits "wb" sensed by companion gap $g_2$.

Workers will appreciate how simple such a servo centering technique is and how it assures that the head is centered over a track before any read-out may begin. This maximizes the gap/bit congruency and the associated accuracy and efficiency of bit detection and/or writing, while at the same time accommodating maximum track density with less concern for head misalignment.

More particularly, a known digital servo system may be set to invoke a certain number of "positioning steps" when translating head "h" fully across a track width (e.g., 30 steps to cross a bit-track completely). And a "centered" limit may be set such that a certain minor misregistration is tolerated (e.g., up to 3 servo steps, or the "time disparity" $T_L$ between di-gap output pulses which corresponds to this, as indicated in FIG. 2 above).

Workers will recognize that servo response to the misregistration (of the di-gaps with the servo di-bits) detected may be a relatively gradual and continual thing. That is, with many sectors and associated sector-preambles normally occurring along a given track, the servo positioning means may be referenced to "coincident di-gap output" several times per disk revolution, with head "h" being responsively "recentered", to some extent, each time a servo di-bit passes. This facilitates a smoother, more gradual and continuous, "centering" mode as workers will appreciate. It also helps to compensate for disk eccentricity and "run-out" along any given track — something quite complex and difficult to accommodate with conventional means.

ECCENTRIC TRACKS

Workers will recognize various applications of the above features; for instance, when tracks are recorded in parallel about a disk to be out of "concentricity" with the disk somewhat. Such "eccentric tracks" are familiar to workers and occur not infrequently (e.g., due to local variations in turntable/shift alignment, etc.). Such are illustrated by eccentric tracks T-i, T-ii, in FIG. 1.

A solution to this problem, along the lines taught, is suggested in FIG. 7 where a pair of di-gap heads $h_1$, $h_2$ are mounted in tandem to simultaneously operate on two respective tracks on a disk DD — one track T-1 being one of several carefully centered "prerecorded servo tracks" (or sectors); the other being a new data track (e.g., T-a), whose concentricity is to be assured. Accordingly, it will be evident that head $h_2$ may be "slaved" to head $h_1$ and be servo-centered therewith, so that when head $h_1$ is registered on a "control servo track" (or track segment T-1, using di-gap/di-bit sensing as taught above), head $h_2$ will "follow" and write a related data track which is concentric with T-1 and with disk DD (e.g., T-a "slaved" to T-1, T-b slaved to T-2, etc.). Further, a "bootstrap mode" may be used whereby certain other new data tracks are, in turn, likewise "slaved", during writing, to (the position of) a respective "first-written" data track (e.g., T-n and head h₂ slaved to T-1 and head h₁).

MIN/MAX MISREGISTRATION

A maximum tolerable misregistration may be built-in to the system by limiting the minimum acceptable amplitude of the servo di-bit read-out. For instance, a 50% misregistration (or 15 "servo-steps" misregistry as above) might be the maximum centering error tolerable; in such case the gaps would be "straddling" two adjacent tracks and the nominal amplitude of the servo read-out pulse corresponding to this might be about 50% of the maximum "fully-centered" read-out amplitude.

In such a case, (and in any instance where a head is so "straddling") the servo control program might be set to arbitrarily command the head to take predetermined corrective action (e.g., "move radially-out ten steps and begin a new centering sequence"). In a related situation, if satisfactory centering were achieved over the wrong track; then upon reading the track number (sensing bits "sb") this would be discovered and no harm done (e.g., no erroneous data read-out would be accepted) — instead, an entirely new "coarse positioning" step could be invoked to re-new the search sequence for the correct selected track. Workers in the art will conceive other conventional ways of handling similar problems using the invention.

Workers will also conceive other ways of employing such servo di-bits. For instance, as described below relative to FIGS. 3 and 3A, one or both oblique portions of a servo di-bit may be interspersed with, or "over-written" upon, work-bits.

EMBODIMENT OF FIG. 3

Figure 3:
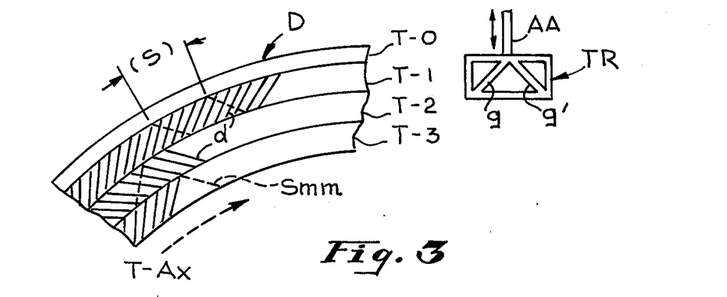
FIG. 3 illustrates a fragmentary plan view of a portion of another magnetic disk record, greatly enlarged, with adjacent tracks and magnetic domains, including another position indicia embodiment therein schematically indicated in positional relation with an associated "di-gap" magnetic transducer; an enlarged showing of one of these tracks and the associated transducer being indicated in FIG. 3A and related indication of illustrative transducer outputs in FIG. 3B.
Figure 3A:
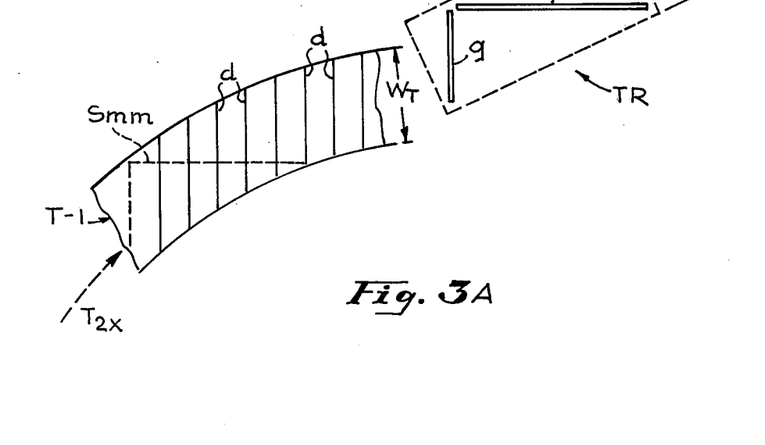

A modified, further improved way of using a skewed orthogonal di-gap transducer, together with similarly-skewed servo-bits is indicated in the embodiment of FIGS. 3 and 3A. Here, a rotatable magnetic disk record D is shown very schematically, with abutting recording tracks (e.g., T-1, T-2, T-3) along which indicated "work-bits" "d" may be recorded as above. Bits "d" will be understood as aligned in parallel oblique to the transport direction (arrow T-A$_X$) and orthogonal between adjacent tracks. A series of "singular" skewed servo-bits "smm" (not di-bits) are here "written-over", or interspersed among, certain work-bits "d" and orthogonal thereto according to this feature. A di-gap head TR may be used for transducing as before.

Workers will appreciate such a "track-on-data" scheme — with a di-gap head operating on "di-bit tracks" (here, the servo-bits and work-bits cooperate — not pairs of servo-bits) as quite new and advantageous — and one that may be implemented in various ways. The magnetizations represented by these bits and their respective magnetic direction are (as above), indicated schematically by the parallel lines "d", "smm". The "orthogonality" between bits may be visualized as a 90° rotation of the magnetic axis of the pre-magnetized domains on the virgin substrate.

Except as otherwise described disk D and associated di-gap head TR (with skewed orthogonal gaps g, g' and accessories, like access arm AA, etc.) will be understood as conventional and similar to those described above with respect to FIG. 1. Thus, the orthogonal skewed transducer di-gaps g, g' are disposed and adapted to be aligned in "magnetic congruence", or registration, with either of bits "d" or bits "smm" (head TR having a width w$_h$ approximately equal to the width w$_t$ of the tracks T). Thus, bits "smm" indicated in phantom in FIGS. 3, 3A will be understood as impressed in a prescribed manner over a track sector corresponding to a prescribed plurality of transverse workbits "d" (—rather than being allocated to separate tracks and/or to separate portions of a data track). Here, servo-bits "smm" span four (4) work-bit sites, for example.

As mentioned above, bits "d", "smm" are skewed, i.e., with respect to "translation axis" T-A$_X$, at angles $\phi$ and $\phi'$ respectively (these preferably being +45° and −45° with respect to T-A$_X$ and thus transverse to one another) and are at right angles with like respective bits from "track-to-track". Such an "adjacent orthogonal/-transverse within track" bit array has been described above. Accordingly, as head TR moves radially across disk D, it will be understood as traversing successive disk tracks to stop "semi-registered" over a selected track; then the bits "d", "smm" will be detected by the passing gap that happens to be aligned therewith and "fine-registration" will follow.

Thus, for instance, when head TR is positioned so that gap "g" overlies track T-1 it will be relatively perfectly aligned to record and/or read work-bits "d" with maximum efficiency (being parallel thereto and "magnetically congruent" when superposed) — while companion gap g', aligned transverse to gap "g", will accordingly be oriented for no significant magnetic interaction with bits "d", and for maximal interaction with bits "smm" (gap "g", in turn, being relatively unresponsive to bits "smm").

Likewise, shifting of head TR to overlie track T-2 will reverse the operative sense of gaps g, g' so that gap g' is uniquely operative with data bits "d", (which are orthogonal to the work-bits "d" along track T-1), while gap "g" lies in exclusive operative alignment with servo-bits "smm". Shifting again to register TR along track T-3 will again reverse the operative senses of the gaps (so they are the same as for T-1).

Workers will understand that the recording and reading is performed conventionally, with narrow magnetic gaps g, g' traversing domains in switching-relation so that if a domain ("bit") is aligned relatively parallel to a given gap and translated there-past in "magnetic congruence", a full-scale read-out signal will be induced from the associated transducer reflecting this passage. The polarity of the induced signal will depend, of course, upon the direction of change of magnetic transition.

According to a feature hereof, the distance interval between a pair of adjacent servo-bits along a given track (see interval S between bits "smm" along track T-1 in FIG. 3) will correspond to a prescribed "reference interval", reflecting a prescribed controlled head/disk velocity. When a perfectly registered (or centered) transducer proceeds along the subject track at the prescribed constant speed, servo output pulses "sop" will issue at prescribed times. These times may be represented as $t_0 + t$, ($t_0 + t_1$, $t_0 + t_2$, etc.) reflecting the position of servo bits "smm" with respect to a fixed standard (e.g., Start Radius SR, see FIG. 1; as known in the art — to indicating radius SR). According to a feature hereof, misregistration of the transducer gaps may be detected in terms of time-variations from these "reference times" sensed from associated output servo signals (e.g., $t_0 + t_1 + t_v$; $t_0 + t_2 + t_v$, etc.).

Such a misregistration is very schematically indicated in FIG. 3A where transducer gaps g, g' of head assembly TR are misregistered "leftward" of track T-1 (assuming the gaps pass in the direction indicated by the arrow), or displaced "radially outward" of disk D. Track T-1 will be understood to include work-bits aligned to be sensed by gap "g", plus transverse servo-bits "smm" aligned to be sensed by gap g'. Such "leftward misregistration" of head TR will be noted as causing gap g' to intersect (a portion of) servo-bits "smm" somewhat "late" and produce an associated servo output pulse "later" in time (delay $\Delta = + t_v$) than the case where gaps g, g' are centered exactly along track T-1. Conversely, "rightward" misregistration of gaps g, g' would cause the g' output to occur "sooner" (delay $\Delta = -t_v$). Comparison of either such misregistered servo output pulse with a train of "reference pulses" representing the "centered head" (or registration) condition, will yield a time difference value $\pm \Delta t$ which may be used to determine the direction, and degree, of misregistration — as workers can visualize (see FIG. 2 description details).

Workers will recognize that such an "orthogonal" magnetic "overwrite" of servo-bits (upon work-bits will, if the bits are substantially orthogonal), render each bit type uniquely responsive to only one of the di-gaps and magnetically isolated from the other bit type. That is, as workers in the art well know, a bit disposed transverse to a transducer gap is relatively "de-coupled", magnetically therefrom and non-responsive thereto. Also, adjacent orthogonal magnetic domains have relatively little significant magnetic interaction with one another.

For instance, consider bit "smm", in FIG. 3A: the net effect of its magnetic domains will be to produce a relatively strong magnetic output signal (sharp magnetic transition when gap g' passes over "smm" in operative magnetic relation or "magnetic congruence", therewith), while being relatively isolated from (no significant magnetic interaction with) "orthogonal" magnetic domains "d" and essentially, "ignored" by passing orthogonal transducer gap "g" (no output induced therefrom). Conversely, gap "g" will produce no significant servo output signal from the passage of bit "smm"; but only from passage of "d".

Restating this from a somewhat different viewpoint, the instant a servo-bit "smm" passes in perfect registration under gap g', it will (momentarily) essentially "fill" the gap 100% with magnetic flux from its magnetic domains (—here aligned in an East-West direction, and constituting an "E-W flux").

The transverse magnetic domains "d", will (especially if they are widely spaced so that only a few intersect bit "smm") present a transverse ("N-S") flux — a flux that fills only a relatively small portion of elongate gap g' (here the "servo-gap"). And their transverse ("North-South") magnetic alignment will have little or no interaction with the "smm" (E-W aligned) domains. As a consequence, bits "smm" will be relatively "isolated", magnetically, from bits "d" along the track; also bits "smm" can generate a servo output, upon passage of gap g' that is relatively independent of bits "d" and of associated "work gap" "g".

Workers may wonder whether misregistration of the transducer head can seriously degrade read-out from a "selected" track and/or introduce "error signals" from bits along the adjacent track — since the tracks are abutted together. For instance, in the embodiment of FIGS. 3, 3A, misregistration of gap g' to the right (or radially-inward from T-1) would overlap track T-2. This would likely a attenuate the "T-1 servo output" (from servo-bits "smm" along track T-1, — to the extent g' is out of "congruence" with gap g') as well as erroneously induce a pick-up in g' from work-bits "d" in adjacent track T-2 ( — to the extent they register with g').

But, workers are quite familiar with known techniques adaptable to distinguish such servo-bits from such work-bits. For instance, the work-bits may be recorded at a particular high frequency, and/or be spaced closer together than servo-bits. In such a case the work-bit read-out can readily be filtered-out by conventional frequency discrimination techniques — the servo-bits along a given track being referenced to a prescribed known "reference spacing" (timing interval) and thus identified from the raw output pulses. (e.g., the mentioned "reference pulses" from the index hole could be used for this). Also, (as above mentioned) MIN-amplitude discrimination can set a limit on which signals are accepted after such misregistration. (See below).

By contrast it will be appreciated that servo di-bits (chevrons) like those indicated in FIGS. 1 and 2 are, for some purposes, more desirable and efficient than single servo-bits — for instance, they are "self-referencing", in the senses of needing no external "reference pulse train" for such purposes. For instance, a control servo pulse train for each track may be stored in "memory" and keyed to the track number and to a prescribed disk rpm. Those may be used as the "reference pulses" to be compared with the raw servo pulses, with any associated errors (lead-time or lag-time) computed with reference thereto.

The significance of the aforementioned dual-gap transducer array and the associated "adjacent orthogonal" alignment of data/servo bits and recording tracks will be evident. Such a "di-bit/di-gap" type "track-on-data" technique is contemplated in the described, and other related recording/servo positioning systems. Such systems will be better understood by consideration of the explanation indicated in FIG. 3B and described below as follows.

FIG. 3B

Figure 3B:
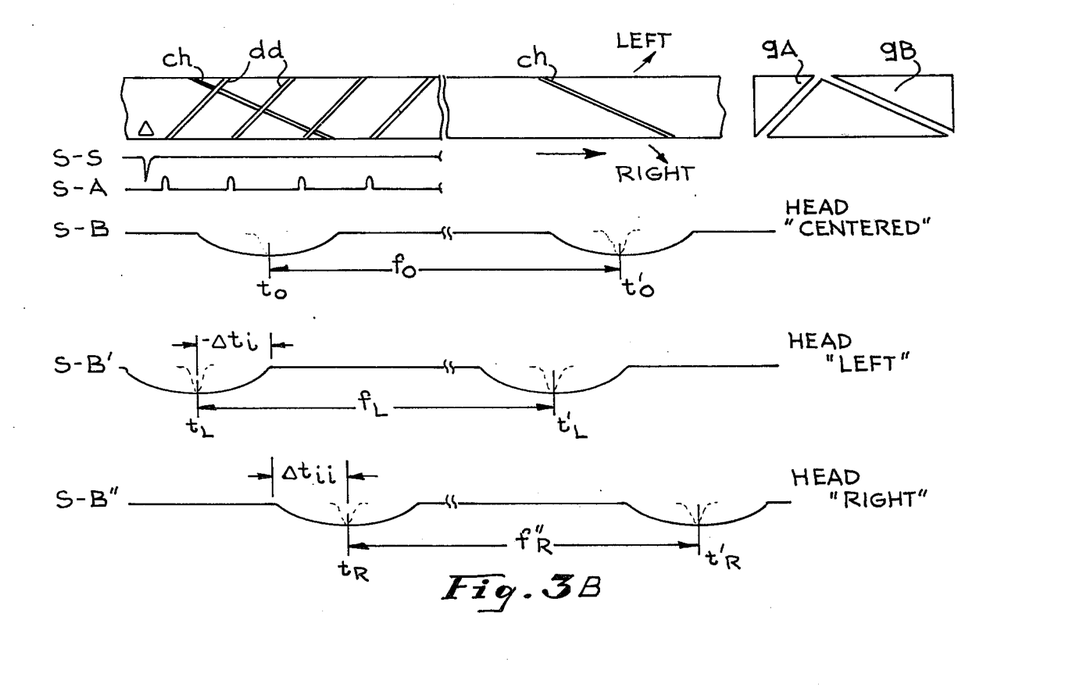

An arrangement like that of FIG. 3, 3A is very schematically shown in FIG. 3B wherein similar data magnetic bits "dd" are obliquely aligned along the indicated track segment, with transverse singular "servo" bits "ch" similarly arranged at selected regular intervals along the track, but aligned orthogonal to data bits "dd", and laid across several of them. Here, (as above) it will be understood that a di-gap transducer arrangement will present two gaps, each to be uniquely parallel and aligned with bits from only one set (see gap $g_a$ for work-bits "dd", and gap $g_b$ for servo-bits "ch" in FIG. 3B). The "data output pulses" (when bits "dd" are sensed by $g_a$) are represented in idealized fashion by pulse train S-A in prescribed chronological/spatial relation with the depiction of work-bits "dd". A related train of "centered" "servo output pulses" S-B is similarly chronological and spatially referenced to servo-bits "ch", (the output from gap $g_b$). It will be understood that, when exactly "centered", gap $g_b$ detects successive servo-bits "ch" to produce the pulses S-B, peaking at the indicated times ($t_o$, $t_o'$, etc.) separated by prescribed normal clock interval, or frequency $f_o$ (reflecting the corresponding spacing and relative transition speed of the servo-bits relative to gap $g_b$). But if the head is "shifted left", off-center, then a time-shifted pulse train S-B' will be generated; whereas a "shift-right" will generate pulse train S-B".

In light of the above explanation, workers will recognize that misregistration of the di-gap transducer assembly (particularly gap $g_b$ therein) to the left of the indicated translation direction (see directional arrow on the track FIG. 3B) will produce a train of clock pulses S-B' which will lead the normal "registration-train S-B' by a prescribed "error time" ($- \Delta t_i$), the magnitude of which is proportional to the degree of (leftward) misregistration (note negative value of $\Delta t_i$ indicating "leftward error", i.e., a "leading relation" to time $t_o$); whereas a rightward misregistration is indicated by pulse train S-B", namely servo pulses which lag the normal pulse time $t_o$ by prescribed positive error-time ($+ \Delta t_{ii}$). As before, one may "center" the transducer simply by comparing the raw servo output [S-B' or S-B"] with a "reference pulse" train [S-B; e.g., stored in memory and issue in prescribed time-relation with the "index pulse"], and using the time-difference ($\pm \Delta t$) to control a conventional servo system (via feedback control, etc.).

It will be appreciated that a "di-bit/di-gap; track-on-data" arrangement and technique as described in the indicated and other related recording-servo positioning systems may be advantageously employed. Such arrangements will be seen as especially advantageous in conjunction with an array of "abutting" of data tracks wherein the work-bits and servo-bits are in orthogonal relation between adjacent tracks and among themselves along a given track.

The above description has been concerned with the manner in which a di-gap head assembly may be precisely positioned among a plurality of selectable abutting track positions using di-bit indicia along the tracks. As pointed out previously, in a conventional type of magnetic disk system to which the present invention may be applied one could employ a plurality of such head assemblies, each arranged to operate with a different sub-set of such tracks — whether provided on a disk or other record medium. It will be understood that the positioning of each such head assembly relative to its data zone may be provided in the same manner as described herein. It will also be understood that, in order to more efficiently employ space on the disk, it is possible to intermingle "work-bits" with orthogonal "position bits" along a track.

However, it will ordinarily be preferred to reserve certain pre-designated "track sectors" of the servo-bits as a means of maintaining the integrity of the servo-indicia inviolate. For instance, a certain amount of "bit-creep" is unavoidable in the course of dozens of cycles of erasing and rewriting work-bits — with the result that, unless an appropriate servo-sector is so reserved, work-bits can shift in position along a track until they eventually creep into the area of the servo-bits, and become confused therewith. (Unless, of course, the entire track is erased and rewritten, including all servo-bits, with each data update, however minor).

It will also be understood that di-gap heads according to the invention will be applied as generally known in the art. One suitable, preferred type of application is suggested by control system 200 very schematically shown in FIG. 5. System 200 is generally structured and adapted to control the output from such a pair of associated transducers ($H_a$, $H_b$ mounted on a common head mount HM) and implement the associated head repositioning and centering. That is, system 200 includes a switch means 211 adapted to route transducer output (also input) according to which head-gap is detecting work-bits and which is detecting servo-bits.

Figure 5:
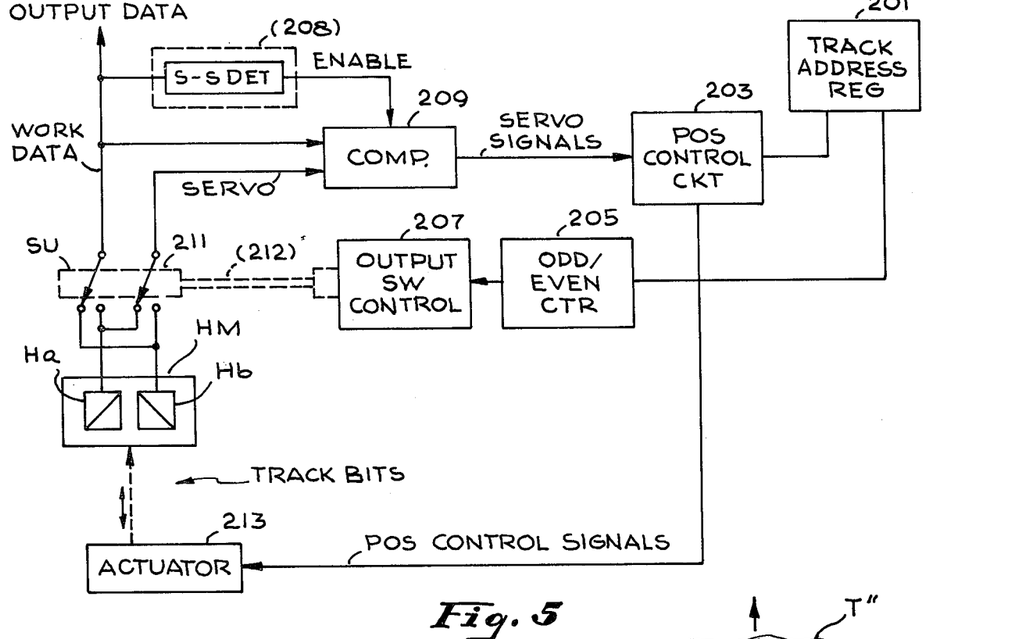
FIG. 5 is a schematic block diagram of a utilization system adapted for "di-bit/di-gap" arrangements like the above.

For instance, according to one preferred data format (mentioned above) servo-bits would align with one gap along all even-numbered tracks (e.g., as shown here for gap $H_a$ — note arrow indicating passage of track bits) and with the other head (e.g., gap $H_b$, here) for all odd-numbered tracks — with work-bits having the reverse format (e.g., here aligned with gap $H_b$ for this even-numbered track).

Accordingly, switch means 211 must be alternated between tracks to implement such a format — e.g., being controlled by an ODD-EVEN counter 205 and associated control 207 responsive to a track address register 201 as shown here. The switch means will include an actuator unit as known in the art (here, only suggested in phantom at 212) and comprise any suitable known mechanism for switching the paired-gap outputs between work-data and servo-data lines.

Such switching of the gap outputs will also involve alternately connecting each gap to a servo feedback loop, implemented as known in the art and, here suggested by comparator (COMP) stage 209 together with position control (circuitry) stage 203, controlling actuator assembly 213 to position (center) the head mount HM over a given track, as is well known in the art.

"COMP" stage 209 preferably is coupled to receive the "work-data" output also, as shown, and includes means for comparing (the synchronism of the) related orthogonal servo-bits (e.g., like marks "sm" in FIGS. 1, 1A, and generating an output (preferably amplified and digitized), representing the degree of head misregistration according to how synchronous the half-bits are (e.g., as in explanation of FIG. 2). "COMP" stage 209 is also adapted to properly enable, or "gate" this comparison output so it issues only when the desired servo-indicia are detected by the paired gaps. One means of doing this is to "gate from the servo pattern itself" — such as by detecting an appropriate "preamble pattern" on the track, or doing so electronically "on the di-bit pattern itself" [e.g., storing di-gap output briefly in a special overflow register and gating-out the contents for servo-use only after detection of this special di-bit indicia]. Workers will contemplate specific known means for effecting this, or for alternative gating. Another gating option is illustrated in phantom at "S-S DET" (a "servo-signal detection") stage 208, which, as known in the art, is adapted to recognize this servo "di-bit" (or related indicia) and, responsively, issue an "enable" signal to so cause stage 209 to issue the mentioned servo signals, applied to "Position Control" stage 203.

"DUAL-FREQUENCY" RECORDING

More particularly, and according to another feature, workers will appreciate that in certain instances, other detection modes may be used with such servo di-bits. For example, the "chevron-like" servo-di-bits may be distinguished between adjacent tracks (from one another and/or from data bits) by a "dual-frequency" mode of recording; whereby one di-bit half is recorded at a first frequency $F_1$ and the other half is recorded at a second frequency $F_2$, distinguishable from the first.

Figures 8, 9:
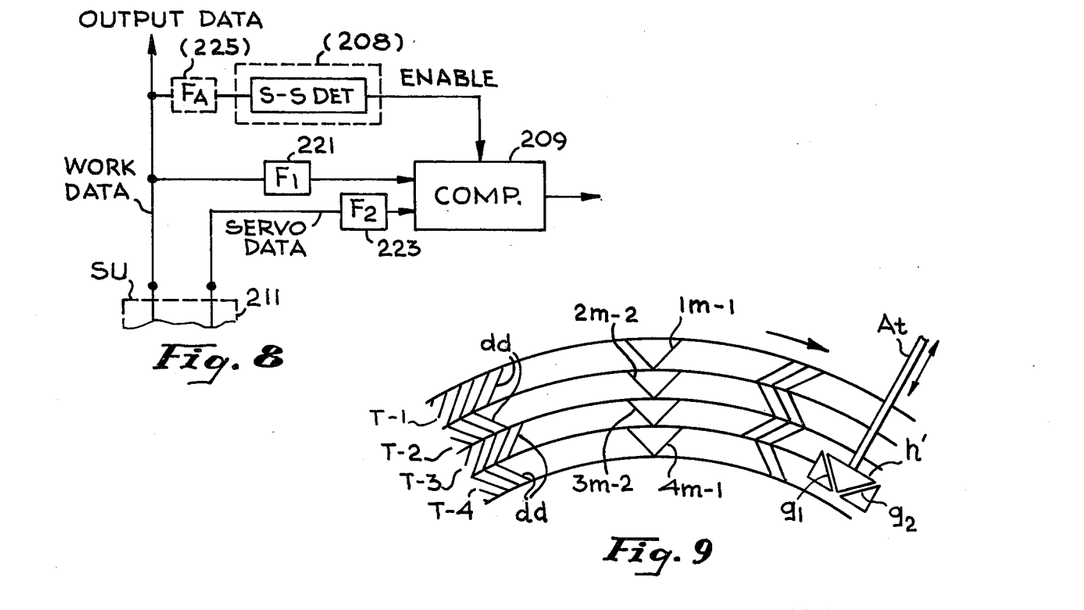

Thus, for instance, — referring to FIG. 9 (understood as representing the same as FIG. 1A, above, except as otherwise described) — in all odd-numbered tracks (e.g., T-1, T-3), the "leading" half-bit may be recorded at the first frequency F₁, (or related wavelength; see half-bits 1m-1, 3m-1), while the "trailing" half-bit (e.g., 1m-2, 3m-2) is recorded at a second frequency F₂, readily distinguishable from the first. Preferably, F₁ and F₂ are not harmonically related and are separated at least one octave to facilitate discrimination in detection (e.g., 12-24 dB separation per octave, will typically be useful using conventional filters, as workers know).

Conversely, the recording mode along even-numbered tracks (e.g., T-2, T-4) is the reverse, with the "leading" bit-halves recorded at F₂ and the "trailing" halves at F₁. This serves to make "adjacent-parallel" half-bits distinguishable by frequency, even when transduced by the same gap.

Thus, as depicted in FIG. 9, even where chevron-halves are recorded directly adjacent one another (along roughly the same disk-radius) and where a read head is mis-aligned and straddles adjacent tracks (e.g., see head h' "straddling" tracks T-3, T-4, with each gap prone to detect parallel marks from both tracks), discrimination between tracks may be made on the basis of characteristic frequency, using appropriate, known detection means.

Thus, for example, suppose that F₁ were set at one tenth the nominal "data rate" dr (e.g., typically about 5 MHz, or a like "MFM" frequency), and F₂ at one seventh:

$$F_1 = dr/10 = 0.5 \text{ MHz};$$

$$F_2 = dr/7 = 0.7 \text{ MHz}$$

Known recording and detection supplementary means may be readily adapted to implement this — as a feature of convenience.

"DUAL-FREQUENCY" DETECTION

Also, assume that the Data-Read-Out circuit is modified with appropriate filter means; for example, as indicated in FIG. 8, where the arrangement of FIG. 5 is modified by addition of two band-pass filter stages 221, 223 as known in the art. Here, each filter will be understood as adapted to pass only its associated characteristic frequency band (F₁, F₂, respectively).

Accordingly, when "g₁" of head h' registers with the trailing half-bits 3m-2, 4m-2 along tracks T-3, T-4 and transduces (detects) about one-half of each, switch 212 may be understood as presenting the "g₁" output only to the "servo-line", now including F₂-filter 223; so that only F₂ encoded output will be passed (to comparator stage 209) as effective "servo-output". Now, since 3m-2 was recorded at F₂ it is "passed", whereas 4m-2, being recorded at F₁, is "not passed", thus filtering out any output from track T-4.

Similarly, the "work-data" output from companion gap g₂ will also present two signals of different encoded frequency to comparator 209 (also to "output data" stages) — outputs from 3m-1 and 4m-1, representing the "leading" half-bits along tracks T-3, T-4. But only one frequency will be passed by filter 221, i.e., frequency F₁, associated with 3m-1, and track 3, while 4m-1, recorded at frequency F₂, will be screened-out and discarded. Thus, the track #3 di-bit is detected preferentially — by such frequency discrimination — and the adjacent track #4 di-bit is effectively ignored, as desired.

Workers in the art will recognize other applications of this feature. For instance, "single-bit" marks, such as data-bits dB may likewise be recorded at different frequencies in adjacent tracks (e.g., F₁ in all "odd" tracks, F₂ in all "even" tracks) for similar frequency discrimination; especially where, as above, di-gap heads are used and such bits are recorded (e.g., over-written) at two orthogonal alignments along a given track (e.g., as in FIGS. 3, 3A, 3B).

A related filter F₄ may be similarly employed at the input to S-S detector 208 — e.g., set to pass only F₁ here so as to screen-out erroneous read-out from an adjacent track (like T-4 in the example above), as workers will understand.

Likewise, such "dual-frequency" recording may be further applied in a "self-centering, self-servoing" adaptation. For instance, referring back to FIG. 4, all marks along even-tracks (e.g., T-b, T-d, etc.) may be recorded at frequency F₂ and all odd-track marks (e.g., along T-a, T-c, etc.) at F₁. Now, if an associated di-gap head (e.g., g_b/g_c) is somewhat mis-centered, straddling two adjacent tracks (e.g., T-a, T-b), like frequency discrimination may be used to indicate registration and give servo control. And, the extent to which the data-rate from one track "leads", or "lags", that of the other can be used as a measure of the degree of mis-registration.

Figure 10A:
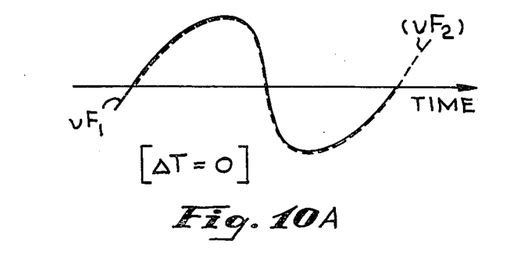
FIGS. 10A, 10B illustrate paired output waveforms indicating a related application of such "dual-frequency" recording.
Figure 10B:
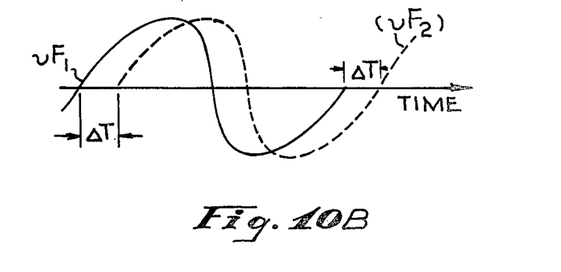

For instance, as workers can see, in certain instances, perfect registration of gaps g_b/g_c over track T-a could be indicated by phase coincidence of output pulses, as schematically depicted in FIG. 10A where signal VF, in full line, understood as the output from gap g_b of marks recorded at frequency F₁ along track T-a, will be seen as coincident, and "in-phase", with the output VF₂ (shown in phantom) from gap g_c of marks recorded along track T-b at frequency F₂ — the frequencies identifying the respective tracks as "even" or "odd" as above. Conversely, a prescribed amount of misregistration, off track T-a and toward track T-b, is indicated by the time "lag" ΔT between these output signals in FIG. 10B.

Workers will visualize refinements of such techniques as well as other related techniques, especially where such "dual-frequency recording" is combined with oblique paired transducer gaps and associated oblique recorded bits.

"DATA-MODULATED CLOCKING"

Figure 11:
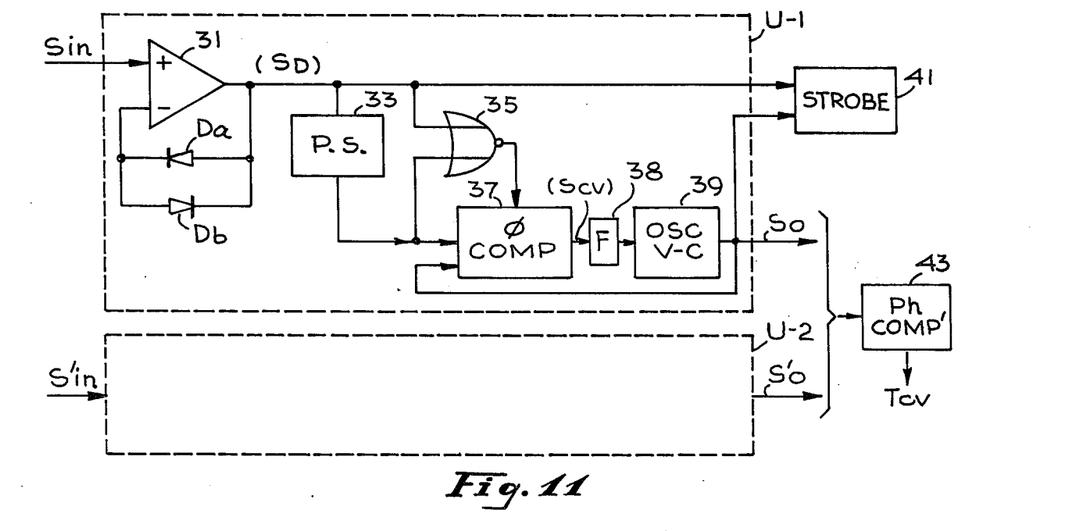
FIG. 11 is a schematic block diagram of a "data-modulated clocking" system according to another feature of invention.

According to a related feature, such recording modes may also be used together with novel "data-clocking" means of the "data-modulated" type, e.g., with an arrangement like the "self-modulated" clocking (data-synchronizing) unit U-1 in FIG. 11. With such means, the work-data from disk tracks (or tape tracks) can be read-out and continually monitored and clocked under better, closer, more "adaptive" control — as controlled by reference (clock) signals which are self-resynchronizing as the data rate varies.

In general, workers will understand unit 11 as comprising a "Phasing system", including Phase Compare stage 37 and responsive V-c Oscillator 39 (plus intermediate match filter 38 as needed) fed by an "Input-adaptive system" including amplification, phase-modulation and trigger means as needed [i.e., here, see amplifier 31, phase-shifter 33 and trigger gate 35]. The output of this "Phasing system" is supplied to appropriate utilization means such as the indicated strobe unit 41.

More particularly, self-clocking unit U-1 in FIG. 11 comprises an input "Operational Amplifier" 31 adapted to accept "raw" data input signals "S_in" (e.g., data read-out as "work-data" in FIG. 8) and, using a known "negative feedback" (loop including back-to-back diodes $D_a$, $D_b$, as known in the art) functions as a "Limiting Amplifier" and squaring circuit. Amplifier 31 will apply squared, amplified (e.g., 10,000X) raw data output signals "$S_D$" to a strobe unit 41, and to synchronizing unit U-1; i.e., to an "Exclusive OR" gate 35 thereof and, optionally but preferably, also to a "phase-shift" stage 33. Stage 33 is adapted to shift the data pulse phase 90° and so provide the "complement" of the data rate for use at Compare stage 37 — being phase-compared with feedback output from OSC 39 — the latter being normally "90° out" of phase with normal data pulses. OSC 39 will be recognized as a variable-frequency clock-oscillator circuit adapted to "lock-onto", and follow, varying data rates.

"OR" gate 35 and phase shifter 33 are coupled to apply their output to a "Phase Compare" stage 37, adapted, as known in the art, to determine whether the flux-transistions representing raw data ($S_D$) are occurring in-phase (i.e., "on time" as planned, at the prescribed reference clock-frequency, $F_c$ — in which case the comparator output, $S_{cv}$, will be "ZERO"); or whether they are "early", or "late", with respect thereto [whereupon output $S_{cv}$ will be negative, or positive, respectively]. OR gate 35 functions to trigger such an electronic phase comparison at stage 37 and stimulate an $S_{cv}$ output for each "early" or "late" data signal $S_{in}$, (each time a flux-transition occurs that is not "90° out" vs. OSC output $S_o$). Gate 35 will be understood as functioning in the manner of a signal differentiator unit (analog or digital) limiting phase-comparison to "data-pulse" times.

Comparator output $S_{cv}$ is applied as an analog control-voltage, through filter 38, to activate voltage-controlled oscillator stage $OSC_{v-c}$ 39. This analog, "voltage-encoded" signal $S_{cv}$ will serve to produce an oscillator output, $S_o$, from 39, the frequency of which will vary (be raised or lowered) depending upon the applied voltage value [positive or negative $S_{cv}$] or remain constant, at $F_c$, where $S_{cv} = O$. Output $S_o$ is applied to strobe 41 and feed-back to Compare stage 37. Filter 38 is a phase-locked loop response filter of known construction.

Thus, the train of clock output signals $S_o$ from variable-clock-oscillator 39 will be "regular" and synchronized with $F_c$ except where the data rate speeds-up or slows-down — in which case its "clock rate" will be increased or decreased accordingly.

Now, ideally, the clock-pulse output $S_o$ will be set to run freely, at "data rate" and phased therewith to "split" the data pulses (i.e., in synchronism with the prescribed data rate, e.g., about 5 MHz, but midway between data pulses, i.e., be 90° out of phase, normally, with $S_o$), so as to have little or no effect on clock circuit U-1. Also, this "midway" relation is, preferably, preserved even under a changing data rate, with the clock pulses $S_o$ accelerated or decelerated accordingly to maintain their position midway between data pulses.

Now, as workers will recognize, such clock pulses $S_o$ may be used, among other purposes, to establish "data cells", or "time-windows", during each of which one data pulse is to occur — and accordingly output $S_o$ may be used to gate-out raw data pulses in prescribed "data-cell" sequence. Such a "time-gating" (clocking-out) function is well known in the art and will be understood as effected conventionally at strobe unit 41.

Strobe 41 will be recognized as conventionally structured and operating to electronically segregate data bits into prescribed "time cells", and thus allow the raw data pulses ($S_o$) to be released in prescribed clock-synchronism. For instance, this will allow two data pulses, separated a bit more than normal (e.g., due to recording mode), to nonetheless be correctly interpreted; e.g., read-out as "1-1" bits — not "1-0-1", etc. The "phase-locking" filter will have a certain characteristic response time, and will usually be maintained relatively slower than the data-rate and prevented from shifting much on "pulse-crowding" shifts in data, while nonetheless maintaining a relatively constant average phase-relation.

Thus, once operating, the normal clock pulses ($S_o$) will emanate from unit 39 ($OSC_{v-c}$) until data pulses $S_D$ are impressed on Comparator 37, (being phase-shifted 90° by 33). Now, trigger 35 will initiate a "compare operation" — of $S_D$ with $S_o$ fed back from OSC — and, if the "nominal" data rate is unchanged, this "compare" will yield no output ($S_{cv} = 0$) and the oscillator rate will continue unmodified. However, if the data rate slows down, comparator 37 can be made to issue a positive output (for example, $S_{cv} = V^+$ causes OSC to responsively slow-down, until feedback to 37 indicates a phase-match). Likewise, accelerated data-rate can cause OSC to speed-up ($S_{cv} = V^-$). Thus, the mentioned "data-modulated clocking" is provided by these, or analogous means known in the art.

The other di-gap track may input to a like clocking unit U-2. Along with U-1, a combinatorial comparator stage (43 in FIG. 11, like stage 37 in FIG. 11) produces a combinatorial output voltage $\pm T_{vc}$ which is proportional to the phase displacement between the two inputs $S_{in}$, $S'_{in}$. Output $T_{vc}$ represents an average time of many comparisons (see filter in each phase-locked loop); and so this system is much less sensitive to media discrepancies, noise-bursts, etc., than conventional ones (e.g., direct tracking di-bit phase comparison). This would allow one to record, and read-out, two data tracks simultaneously, and compare the "strobe beat" of each while doing so — using two such "self-generated, self-modulated" clock units to cross-check and verify data decoding and strobing. The $\pm T_{vc}$ signal can provide a continual indication of tracking error (for the tracking servo), while facilitating maximal data storage density.

Workers will appreciate how aptly such an output processing system, and/or such clocking cooperate with such "di-bit/di-gap" arrangements according to the invention. In particular, the combined "di-bit comparing", "output-switching" means and frequency-discrimination co-act with the rest of a conventional servo system to effect efficient head-registration without the shortcomings of conventional techniques — e.g., with susceptibility to erroneous amplitude-fluctuation (e.g., due to noise, velocity shift, etc.), or to erroneous or complex velocity variations (e.g., in turntable or in delay or clock mechanisms), etc. Details of this and like implementation are well known to workers (e.g., see comparable arrangements in U.S. Pat. No. 4,007,493 to Behr, et al.; U.S. Pat. No. 3,903,545 to Beecroft, et al.; U.S. Pat. No. 3,185,972 to Sippel and U.S. Pat. No. 3,686,649 to Behr, and in other patents cited above).

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein are also applicable to tape systems and the like, as well as to drums, etc. Also, the present invention is applicable for providing the positioning required in applicable for providing the positioning required in other forms of recording and/or reproducing systems, such as those in which data is recorded and reproduced optically.

The above examples of possible variations of the present invention are merely illustrative. Accordingly, the present invention is to be considered as including all possible modifications and variations coming within the scope of the invention as defined by the appended claims.

What is claimed is:

1. An improved method of detecting and reading-out digital recording signals, this method adapted for improving signal detection means which functions to provide prescribed output data pulses at a prescribed nominal data rate, as controlled by output control means, the method comprising:

providing variable oscillator means adapted to generate prescribed clock pulses at a nominal clock-rate, synchronous with said nominal data rate, and apply these to said control means, said clock pulses being normally synchronized to occur relatively midway between adjacent of said nominal data pulses;

and providing associated phase compare means adapted to receive said data pulses as well as said clock pulses and to determine their synchronism and to provide a "compare-output" representing the extent of variance from said nominal data rate and apply this compare-output to said oscillator means and further providing gating means adapted to allow said compare means output to be applied to said oscillator means only when a data pulse occurs;

this compare output thus providing a measure of the variance from said "mid-position" of said clock pulses and the "mid-position" between adjacent data pulses and accordingly serving to control and modulate said clock rate so as to maintain correspondence with, and synchronism with a varying data rate by causing said clock oscillator means to accelerate or decelerate said clock rate in accordance with the varying data rate.

2. The method as recited in claim 1, wherein said phase compare means additionally includes input means and output means, said input means including phase shift means and trigger circuit means, each connected at the input to the phase compare means, said trigger circuit means being adapted to initiate each comparison function in prescribed response to the receipt of each data pulse; said phase shift means being adapted to shift each said data pulse approximately 90° to facilitate a simple comparison thereof with said clock pulses, whereby said "compare-output" will be issued such as to represent any discrepancy from said data rate as an apparent variance from coincidence between data pulses and clock pulses; said output means comprising a phase locked loop responsive filter means.

3. The combination as recited in claim 2, wherein said clock oscillator means is voltage-controllable and wherein said "compare-output" is adapted to apply positive-going or negative-going voltage signals to said oscillator means, via said filter means, these signals representing the degree to which the clock pulses lead, or lag, said nominal clock pulses, with said oscillator means being responsively accelerated or decelerated to maintain said "mid-way relation" between successive data pulses.

4. The combination as recited in claim 3, wherein said control means includes strobe circuit means adapted to ordinarily receive said data pulses in parallel with said clock pulses and responsively emit "processed data pulses" under the gating control of said clock pulses.

5. The combination as recited in claim 4, wherein said data pulses are also amplified and "squared" before application to said phase compare means and said strobe circuit.

6. The combination as recited in claim 1, as applied for the processing and strobe-clocking of two channels of data pulses, one channel being applied to a first such compare means and associated oscillator means to drive a first synchronized clock output; the other channel likewise applied to a second such compare means and associated oscillator means to drive a second synchronized clock output;

and also including a summing phase compare means adapted to receive both said clock outputs and to coordinate the relative phase thereof.

* * * * *

UNITED STATES PATENT AND TRADEMARK OFFICE
CERTIFICATE OF CORRECTION

PATENT NO. : 4,148,080
DATED : April 3, 1979
INVENTOR(S) : Herbert U. Ragle and Norman S. Blessum It is certified that error appears in the above-identified patent and that said Letters Patent are hereby corrected as shown below:

Col. 2, line 20, change "certan" to —certain—.
Col. 3, line 44, change "McIntosh" to —McIntoch—;
line 62, change "responser" to —response—.
Col. 6, line 41, change "is" to —in—.
Col. 8, line 14, change "FIGS. 1 and 1A]." to —FIG. 1A].—.
Col. 9, line 49, change "depicated" to —depicted—.
Col. 16, line 25, change "senses" to —sense—.
Col. 17, line 8, change "S-B'" to —S-B—;
line 49, change "of" to —for—.

Col. 21, line 40, change "feed-back" to —fed-back—.
Col. 23, line 2, delete entire line.

Signed and Sealed this

Eleventh Day of September 1979

[SEAL]

Attest:

LUTRELLE F. PARKER

*Attesting Officer*     *Acting Commissioner of Patents and Trademarks*